(12) United States Patent
Jones et al.

(10) Patent No.: US 8,589,902 B2
(45) Date of Patent: Nov. 19, 2013

(54) POLICY DESCRIPTION TECHNIQUE IN UEFI FIRMWARE

(75) Inventors: Stephen E. Jones, Bellevue, WA (US); Eugene Khoruzhenko, Redmond, WA (US)

(73) Assignee: Kinglite Holdings Inc., Singapore (SG)

( * ) Notice: Subject to any disclaimer, the term of this patent is extended or adjusted under 35 U.S.C. 154(b) by 787 days.

(21) Appl. No.: 12/756,446

(22) Filed: Apr. 8, 2010

(65) Prior Publication Data

US 2010/0318962 A1   Dec. 16, 2010

Related U.S. Application Data

(60) Provisional application No. 61/268,562, filed on Jun. 13, 2009.

(51) Int. Cl.
G06F 9/44 (2006.01)

(52) U.S. Cl.
USPC ............................. 717/162; 717/107; 717/121

(58) Field of Classification Search
None
See application file for complete search history.

(56) References Cited

U.S. PATENT DOCUMENTS

| | | | | |
|---|---|---|---|---|
| 6,167,562 A * | 12/2000 | Kaneko | .......................... | 717/109 |
| 7,130,701 B1 * | 10/2006 | Wischinski | ..................... | 700/65 |
| 7,203,808 B2 * | 4/2007 | Rothman et al. | .............. | 711/163 |
| 7,299,462 B2 * | 11/2007 | Shann et al. | ................... | 717/153 |
| 7,464,367 B2 * | 12/2008 | Wain et al. | ..................... | 717/105 |
| 7,584,465 B1 * | 9/2009 | Koh et al. | ...................... | 717/162 |
| 7,676,788 B1 * | 3/2010 | Ousterhout et al. | .......... | 717/106 |
| 7,698,547 B1 * | 4/2010 | Polyudov | .......................... | 713/2 |
| 7,873,807 B1 * | 1/2011 | Polyudov | ...................... | 711/165 |
| 7,890,925 B1 * | 2/2011 | Wyatt et al. | .................... | 717/106 |
| 8,078,637 B1 * | 12/2011 | Polyudov | ...................... | 707/791 |
| 8,086,839 B2 * | 12/2011 | Yao et al. | ........................... | 713/2 |
| 8,201,163 B2 * | 6/2012 | Walker et al. | ................. | 717/174 |
| 8,234,626 B2 * | 7/2012 | Hawk et al. | ................... | 717/114 |
| 8,250,521 B2 * | 8/2012 | Zhang et al. | ................... | 717/104 |
| 8,312,116 B2 * | 11/2012 | Kohn et al. | .................... | 709/222 |
| 8,321,656 B2 * | 11/2012 | Jones | ................................. | 713/2 |
| 8,468,332 B2 * | 6/2013 | Jones | ............................... | 713/2 |
| 8,484,631 B2 * | 7/2013 | Mortensen | ..................... | 717/162 |

(Continued)

OTHER PUBLICATIONS

Ruth Li, UEFI Driver Development Training Using EDK I LAB, published by UEFI Plugfest presentation 2007, pp. 1-40.*

(Continued)

*Primary Examiner* — Tuan Q. Dam
*Assistant Examiner* — Zheng Wei
(74) *Attorney, Agent, or Firm* — Lowe Hauptman & Ham, LLP (57) ABSTRACT

In a method of building a firmware component to execute a sequence of instructions in a device having a computer, a plurality of build files is processed to form a set of buildable statements of hardware policy. The buildable statements are decoded to form a Configuration Manager namespace. Contents of the Configuration Manager namespace are linked to a UEFI compatible kernel program having a Configuration Manager capability. Alternatively, a data stream representing the contents of the Configuration Manager namespace is encoded to form a Configuration Manager database readable by the UEFI compatible kernel program at a run-time. A plurality of UEFI device driver programs and the UEFI compatible kernel program are linked to form the firmware component.

9 Claims, 7 Drawing Sheets

(56) References Cited

U.S. PATENT DOCUMENTS

| 2004/0098706 | A1* | 5/2004 | Khan et al. | 717/120 |
|---|---|---|---|---|
| 2004/0221267 | A1* | 11/2004 | Chase et al. | 717/121 |
| 2005/0015745 | A1* | 1/2005 | Wain et al. | 717/105 |
| 2007/0050762 | A1* | 3/2007 | Chen et al. | 717/169 |
| 2007/0220496 | A1* | 9/2007 | Kasama | 717/136 |
| 2008/0234999 | A1* | 9/2008 | Cohen et al. | 703/26 |
| 2008/0256522 | A1* | 10/2008 | Narisawa et al. | 717/140 |
| 2009/0044185 | A1* | 2/2009 | Krivopaltsev | 717/173 |
| 2009/0319806 | A1 | 12/2009 | Smith et al. | |
| 2010/0017796 | A1* | 1/2010 | Walker et al. | 717/174 |
| 2010/0042821 | A1 | 2/2010 | Harmer | |
| 2010/0169631 | A1* | 7/2010 | Yao et al. | 713/2 |
| 2010/0169633 | A1* | 7/2010 | Zimmer et al. | 713/2 |
| 2010/0306774 | A1* | 12/2010 | Kalbarga | 718/1 |

OTHER PUBLICATIONS

Paul Dubios, Software Portability with imake, published by O'Reilly & Assoicates, Inc, 1993, isbn: 1-56592-055-4, pp. 8-12, 22-23, 33-35, 90-95, 192-193.*
EFI Development Kit (EDK) Getting Started Guide, Version 0.41, Jan. 14, 2005, published by Intel, pp. 19-24.*
UEFI Programming—First Step vid, Mar. 31, 2009, Revision 1.0, [Retrieved online on Jul. 10, 2013 at http://x86asm.net/articles/uefi-programming-first-steps/], pp. 1-9.*
Way Back Machine archived webpage for downloading presentations for UEFI Plugfest Jun. 11-15, 2007, [Retrieved online on Jul. 10, 2013 at http://web.archive.org/loveweb/http://www.uefi.org/learning-center/presentationsand videos/], pp. 1-4.*

* cited by examiner

```
Define ComPort {
  Config Name = "Template"
  Config IoAddress = 0x3f8
  Config Irq = 4
  Config PciBdf
}

ComPort Uart1
  Set Uart1.Name = "My UART"
  Set Uart1.IoAddress = 0x2f8
  Set Uart1.Irq = 3

Apiclrq Irq0                          // unique identifier for this record.
  Set Irq0.ISAIRQ, 0                  // value of ISA IRQ to map.
  Set Irq0.SYSINT, 2                  // global system interrupt number.
  Set Irq0.POLARITY, ACTHIGH          // polarity: active high.
  Set Irq0.TRIGGER, EDGE              // trigger mode: edge triggered.

//
// System Control Interrupt (SCI) override.
//

Apiclrq Scilrq                        // unique identifier for this record.
  Set Scilrq.ISAIRQ, CONFIG_ACPI_SCI_IRQ> // value of ISA IRQ to map.
  Set Scilrq.SYSINT, CONFIG_ACPI_SCI_IRQ  // global system interrupt no.
  Set Scilrq.POLARITY, ACTHIGH        // polarity: active high.
  Set Scilrq.TRIGGER, LEVEL           // trigger mode: level triggered.
```

POLICY DESCRIPTION TECHNIQUE IN UEFI FIRMWARE

RELATED APPLICATIONS

This application claims priority to U.S. Provisional application for a patent No. 61/268,562 entitled INNOVATIONS IN SECURECORE TIANO 2.0 filed Jun. 13, 2009 inventor Stephen E. Jones and which is incorporated in its entirety by this reference.

FIELD OF THE INVENTION

The present invention generally relates to personal computers and devices sharing similar architectures and, more particularly, relates to a system and corresponding or related method for parametric policy isolation in builds of UEFI (Unified Extensible Firmware Interface) based Personal Computer firmware, usually BIOS (Basic Input-Output System). Similar processes and entities within comparable computing apparatuses also fall within the general scope of the invention. Most, but not all, policy is hardware policy and policy is a well-known term of art in the BIOS, firmware and UEFI arts.

BACKGROUND OF THE INVENTION

Modernly, the use of PCs (personal computers), including so-called laptop and notebook computers, is increasingly common and the computers themselves are ever more powerful and complex. Hardware development continues at great rates resulting in families of PCs that share parts and partial configurations yet have evolving capabilities and legion configurations. A persistent problem is the management of needed changes and enhancements to firmwares as new versions of hardware and entirely new hardware subsystems are phased in—while simultaneously avoiding excessive duplication of effort across families of related, but different, computer products. Frequently the differences are trivial at a technical level, but nonetheless crucial at an operational level.

Modernly detailed decisions as to hardware policy may be deferred until later in the development cycle than was former practice. Moreover, system variants using parts selected pursuant to tactical changes may arise. This can require rapid and adaptive approaches to hardware and related policy and flexibility in implementation. This leads to a need for capabilities above and beyond those found in previously developed solutions.

Firmware development is typically quite different from software development, including that firmware operates in unusual hardware configurations (which configurations change as the firmware moves through its run-time phases). Also firmware has an intimate relationship with hardware, especially since hardware is nowadays far more complex than it formerly was. This is a situation that software rarely has to contend with in modern times. The adoption of UEFI (Unified Extensible Firmware Interface) developed from Intel's EFI (Extensible Firmware Interface) based Personal Computer firmware can facilitate, but does not in itself provide, parametric policy isolation. Parametric policy isolation allows a less expert and more efficient approach to policy adaptation and evolution to be adopted, especially in response to evolving PC product requirements A significant advantage of embodiments of the invention over previously developed solutions is that the support of policy, including hardware policy is facilitated. In consequence a plurality of more consistent and higher quality UEFI based distributed products emerge with proportionally less development effort.

SUMMARY OF THE INVENTION

The present invention provides a method for packaging, compiling, linking, merging and/or executing programs that embodies the invention. In addition program products and other means for exploiting the invention are presented.

According to an aspect of the present invention an embodiment of the invention may provide a method for firmware parametric policy isolation in builds of Unified Extensible Firmware Interface based Personal Computer firmware.

The method may include build-time activities including processing files to form statements of hardware policy; decoding the statements to form a CM (Configuration Manager) namespace; linking the namespace with a UEFI compatible kernel; encoding the namespace into a CM database and linking UEFI device driver programs with a kernel program to form a BIOS firmware.

According to a further aspect of the invention, at run-time the kernel may read the CM namespace from wherever it is to be found.

Program products on recording media and programs transmitted by Internet and similar means that provide for the method are also within the scope of the invention.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which.

DETAILED DESCRIPTION OF THE INVENTION

The numerous components shown in the drawings are presented to provide a person of ordinary skill in the art a thorough, enabling disclosure of the present invention. The description of well-known components is not included within this description so as not to obscure the disclosure or take away or otherwise reduce the novelty of the present invention and the main benefits provided thereby.

Embodiments of the invention disclosed herein provide a way for persons adapting firmware BIOS (Basic Input-Output System) to describe the desired behavior of the system and the organization of the hardware to the build through project file statements. These behavioral and organizational artifacts are hardware policies and in embodiments of the invention they may ultimately be queried at BIOS run-time by drivers in the system to affect their operation. BIOS run-time may typically include UEFI phases of at least PEI (Pre-EFI initialization), DXE (driver execution environment), BDS (boot device selection).

In order to address these issues the structure, both build-time and run-time of the UEFI components (typically modules) has been reworked in a novel and advantageous configuration. The improvements are as described below.

Figure 1:
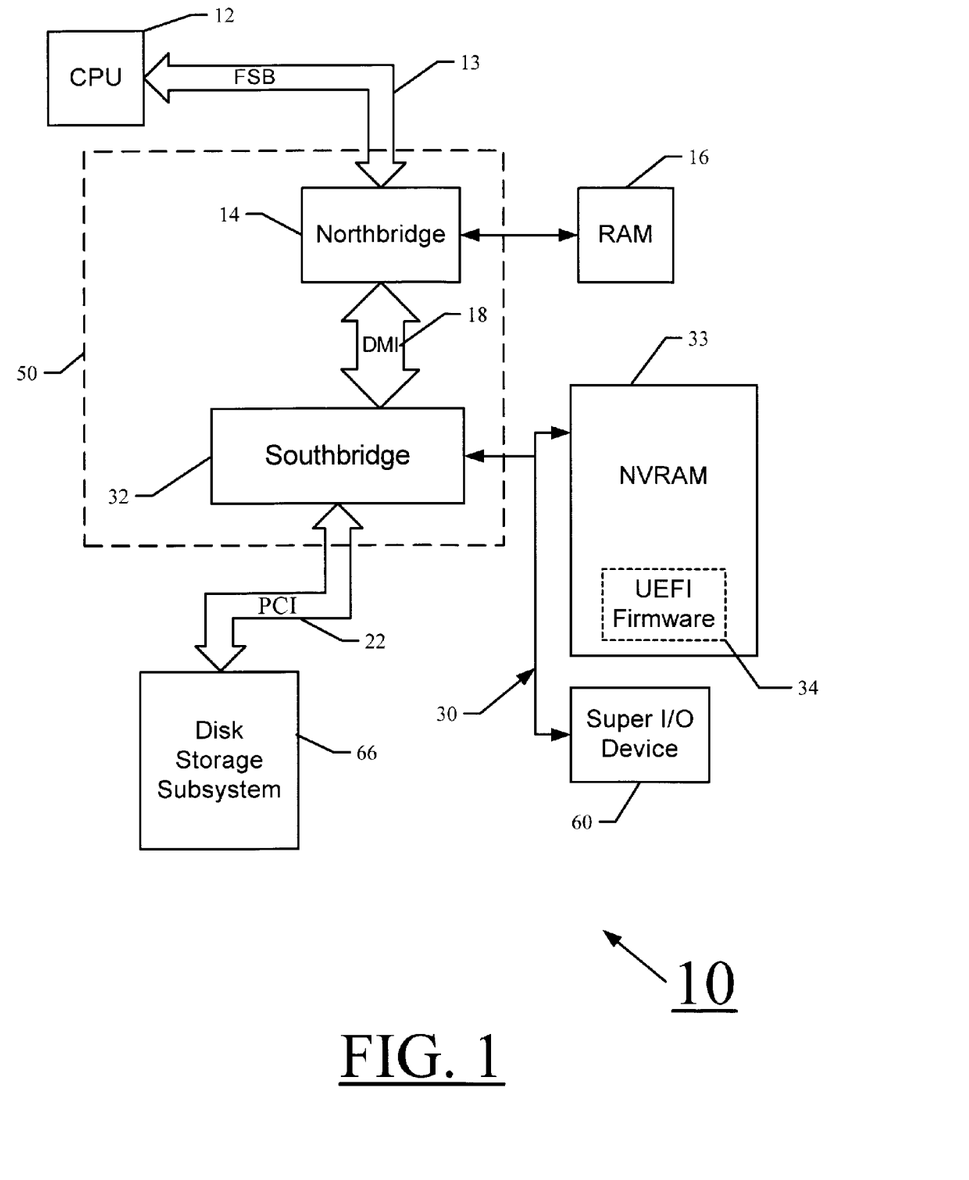
FIG. 1 is a schematic block diagram of an electronic device configured as a target device into which firmware generated using the present invention may be loaded and utilized.

Referring now to the drawings, in which like numerals represent like elements throughout the several figures, aspects of an exemplary operating environment and the implementations provided herein will be described. FIG. 1 is a schematic block diagram of an electronic device configured to implement the firmware target system operational functionality according to the present invention.

FIG. 1 is a schematic block diagram of an electronic device configured as a target device into which firmware generated using the present invention may be loaded and utilized. FIG. 1 shows a computer 10 that is operative to provide an EFI/UEFI firmware environment to provide a DXE (Driver Execution Environment) phase and/or a BDS (Boot Device Selection) phase. DXE and BDS are well known in the UEFI arts. The computer 10 typically includes a baseboard (not shown in FIG. 1), or motherboard form of printed circuit board to which a multitude of components or devices are connected by way of a system bus or other electrical communication path. In one illustrative embodiment, a CPU (central processing unit) 12 operates in conjunction with a chipset 50. The CPU 12 is a standard central processor that performs, inter alia, arithmetic and logical operations necessary for the operation of the computer.

Chipset 50 may include a Northbridge 14 and a Southbridge 32. The Northbridge 14 may be attached to CPU 12 by a FSB (Front Side Bus) 13 and typically provides an interface between the CPU 12 and the remainder of the computer 10. The Northbridge 14 may also provide an interface to a RAM (random access memory) 16 the main memory for the computer 10 and, possibly, to other devices such as an on-board graphics adapter (not shown in FIG. 1).

The Northbridge 14 is connected to a Southbridge 32 by a DMI (direct media interface) 18. The Southbridge 32 may be responsible for controlling many of the input/output functions of the computer 10 such as USB (universal serial bus), sound adapters, Ethernet controllers and one or more GPIO (general purpose input/output) port (None shown in FIG. 1). In one embodiment, a bus comprises a PCI (peripheral component interconnect) bus circuit 22 to which a disk storage subsystem 66 (often abbreviated to "disk") or other storage devices for storing an operating system and application programs may be attached.

The Southbridge 32 may also provide SMM (system management mode) circuits and power management circuitry. A peripheral interface 30 may also be provided by the Southbridge 32 for connecting a Super I/O (Super input-output) device 60. Southbridge 32 may also incorporate a timer circuit for generating timer circuit interrupts typically at periodic intervals.

As known to those skilled in the art, an O/S (operating system) such as may be stored on disk 66 comprises a set of programs that control operations of a computer and allocation of resources. An application program is software that runs on top of (is loaded and directed by) the O/S software and uses computer resources made available through the O/S to perform application specific tasks desired by a user of the computer 10.

Disk 66 may also provide non-volatile storage for the computer 10. Although the description of computer-readable media contained herein refers to a mass storage device, such as a hard disk or CD-ROM (Compact-Disc-ROM) drive, it should be appreciated by those skilled in the art that computer-readable media can be any available media that can be accessed by the computer 10. By way of example, and not limitation, computer-readable media may comprise computer storage media and communication media. Computer storage media includes volatile and non-volatile, removable and non-removable media implemented in a method or technology for storage of information such as computer-readable instructions, data structures, program modules or other data. Computer storage media includes, but is not limited to, RAM, ROM, EPROM (Erasable, programmable ROM), EEPROM (Electrically EPROM), serial EEPROM, Flash memory or other solid state memory technology, CD-ROM, DVD (Digital Versatile Disk), or other optical storage, magnetic cassettes, magnetic tape, magnetic disk storage or other magnetic storage devices well-known in the art, or any other medium which can be used to store the desired information and which can be accessed by the computer.

The peripheral interface 30 may also connect a computer storage media such as a ROM (not shown) or, more typically, a flash memory such as a NVRAM (non-volatile random access semiconductor memory) 33 for storing UEFI platform firmware 34 that includes program code containing the basic routines that help to start up the computer 10 and to transfer information between elements within the computer 10. The UEFI firmware 34 is compatible with the UEFI Specification.

It should be appreciated that the computer 10 may comprise other types of computing devices, including hand-held computers, embedded computer systems, personal digital assistants, and other types of computing devices known to those skilled in the art. It is also contemplated that the computer 10 may not include all of the components shown in FIG. 1, may include other components that are not explicitly shown in FIG. 1, or may utilize an architecture different from that shown in FIG. 1.

One embodiment of the invention in the SCT2 (Secure-Core Tiano version 2.0) firmware product. SCT2 is a UEFI compliant BIOS product from Phoenix Technologies Limited (hereinafter "Phoenix"). Organizations that license the SCT2 product may variously obtain and use source codes, executable object and linkable object module that may go through a build process to generate a BIOS that meets a particular need and is tied to a particular hardware platform and a limited number of hardware policies. Such organizations may be referred to herein as customers, thus reflecting their typical commercial relationship with Phoenix Technologies Limited.

Policy, and specifically hardware policy, determines higher-level hardware-oriented features and operating aspects that are particular to a specific PC (Personal Computer) product and which relate to BIOS. Examples of policy include I-O (Input-Output) addresses of ports and of hard-wired or microcoded registers, the number of CPUs in a multiprocessor configuration, retry maxima and associated timings and myriad other hardware minutiae.

The invention may embody, for example in SCT2, a policy description innovation for customers to describe the desired behavior of the system and the organization of the hardware, to the build, through project file statements. Device drivers may subsequently query these policies at run-time in the system to so as to affect and/or direct the operation of the device drivers.

Customization is a part of BIOS development wherein an ODM (original device manufacturer) or OEM original equipment manufacturer) (herein known as customer for short) adapts a BIOS for a particular customer's platform. Customization provides the unique policies and behaviors required by the customer to make the system achieve its design aims in the marketplace, manufacturable, and (wholly or partly) compatible with other customer systems.

Policy is a related, but separate concept from customization. In some cases wherein firmware is being adapted to a target product it is necessary to write one or more drivers to override a default CRB (customer reference board) module and so-doing constitutes customization. CRBs are well-known in the firmware BIOS arts. Sometimes new procedural code is not required, but it is sufficient to enable or disable particular features, set values for hardware parameters, and/or so on. These hardware oriented values, Booleans and the like are termed policy commonly hardware policy, also policy may involve related entities such as timeout values, rety counts and the like.

Thus, policy may be used to indirect hardware oriented features and can apply equally to SCT2 standard drivers or to customer written device drivers (which typically would be added into an SCT2 Board layer).

In the SCT2 exemplary embodiment of the invention firmware is organized as a multilayered operating environment, with each layer exposing an interface to the higher layers and drawing on services of layers beneath. These layers are described below.

Figure 2:
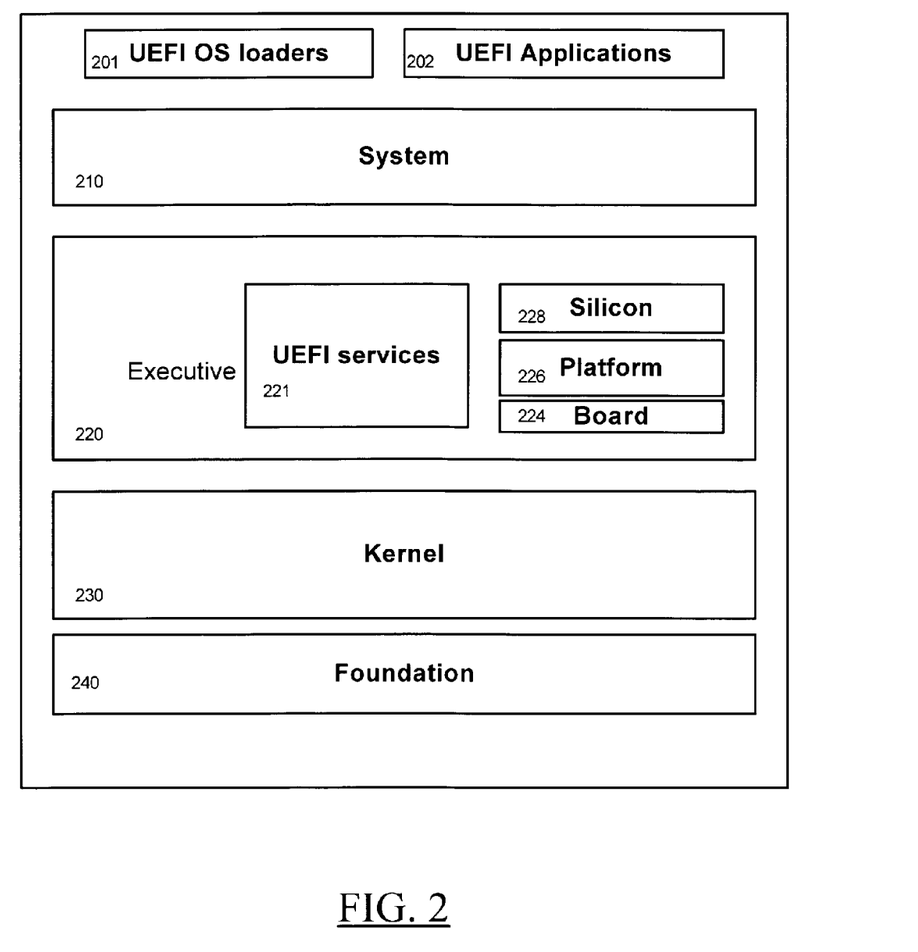
FIG. 2 illustrates some interfaces between the Foundation, Kernel, Executive, and System firmware layers according to an embodiment of the invention.

FIG. 2 illustrates some interfaces between the Foundation, Kernel, Executive, and System firmware layers according to an embodiment of the invention. A first layer, the Foundation layer 240 shown is sometimes known as the "Green H". This is well-known in the UEFI arts and typically invariant from that in other UEFI firmware implementations.

Still referring to FIG. 2, a second layer is the Kernel 230; this is a policy-less kernel environment enabling execution in a range of contexts, including UEFI-defined services, together with supplier-defined services. Components of the Kernel 230 in SCT2 typically include a lightweight Microkernel in addition to the system's CM (Configuration Manager), TCB (Trusted Computing Base) and C language Library. According to an important aspect of the invention, the CM manipulates policy data and provides related services to the Executive layer as described below.

The Kernel 230 collectively ties multiple execution environments together in an architected manner that is fast, secure, reliable, and free of customer-supplied policy. As an implementation detail the kernel may be loaded as a DXE driver, but it is multi-threaded, multi-processor supporting, multi-tasking, resource managing, preemptively-scheduled and generally includes all advanced modern low-level operating system features.

The Executive layer 220 provides policy-implementing services, including common implementations of default UEFI Services 221, including Boot Services, Run Time Services, centralized table management (including System Table emulation, ACPI (Advanced Configuration and Power Interface) tables, and PCI (Peripheral Component Interconnect) routing), load option management for BDS (Boot Device Selection), an SMM (system management mode) Manager, and a Virtualization Manager. Also within the Executive layer 220 are found Silicon module(s) 228, Platform Module(s) 226 and Board Modules 224; these are further described below.

Still another layer is the System layer 210 which provides BIOS-oriented components; for example Data volume file systems, Disk I/O, Boot Mode, Console, Video, Mouse, etc. Finally we find UEFI O/S (operating system) loaders 201 and UEFI Applications 202.

Each of the SCT2 layers is specifically included at build time as defined by a project definition, and each is individually versioned. Thus, it is possible for one project to refer to an earlier version of the Foundation, for example because the Silicon modules for the subject project could need the earlier version of Foundation, whereas other projects may refer to later versions of the Foundation.

The policy-related interacting Silicon, Platform and Board modules will now be described. Silicon modules (Ref. 228 in FIG. 2) are implemented by silicon vendors and provide, among other things, early initialization of the PCI host bus controllers, memory controller, and system memory during the PEI phase. Silicon modules use the Platform module(s) by requesting performance of platform-specific functions.

Typically and desirably, Silicon modules do not implement policy themselves, but instead obtain their policy from the Platform module. An example of policy at the silicon level would be how memory is organized. In some systems, user-installable RAM (random-access memory) may contain on chip SPD (Serial Presence Detect) EEPROMs (Electrically erasable programmable read-only memories) accessible via the SMBUS (System management bus). These SPD devices contain information such as memory geometry and timing data that may be necessary to properly program the memory controller such that the memory modules will function correctly and according to performance specification. However, some board designs may have soldered-down memory, in which case SPDs may or may not be present; and the equivalent of SPD information may be stored elsewhere, for example in Flash memory. The policy decision of selecting between using SPDs or Flash values should be made by the OEM (Original Equipment Manufacturer) customer, as it directly relates to the design. As such, the silicon module would call a PPI (PEI module to PEI module interface) function implemented by the Platform to determine the memory configuration parameters such as geometry and timing.

In SCT, Platform modules are typically large, complex and provided by the supplier (Phoenix). The role of Platform modules is to provide the PPI and DXE protocol based services as may be needed by families of Silicon modules. Platform modules are preferably not modified by the OEM customer. Instead, Platform modules call strongly-architected Board module(s), that are created by the customer.

At their lower edge, Platform modules invoke the Board module(s) through a strongly-architected interface. The Platform module handles the system's policy through build controls, such as may be defined in module definition and project definition files.

Board modules provide a focus for OEM-written code that implements customization policies. From a packaging point of view, Board modules may consist of C language source files containing implementations of functions written by the OEM matching a Phoenix-defined specification for the Board module interfaces. The Board module will typically use CM (Configuration Manager) services of the kernel to obtain policy information.

An OEM's Board module is compiled into a library that supplies the functions called by the Platform module. Implementation of Board module functions is optional; OEMs are typically but not always required to implement any functions. When Board functions are not implemented by the OEM, the default implementations are supplied by a second Phoenix-supplied library in the Executive layer.

The Board module contains a module definition configuration file (MODULE.DEF). This file serves multiple purposes. One purpose is to specify the Platform family that supports the board module. Another purpose is to provide hardware-related configuration parameter overrides for the defaults provided by the Platform module. These overrides indicate the hardware differences between the original Platform and the Board-specific design.

The Policy Description innovation in SCT 2.0 provides a way for customers to describe the desired behavior of the system and the organization of the hardware to the build through project file statements. The generated policy information, encoded as data is queried at BIOS run-time by drivers in the system so as to affect and/or direct their operation.

Figure 3A:
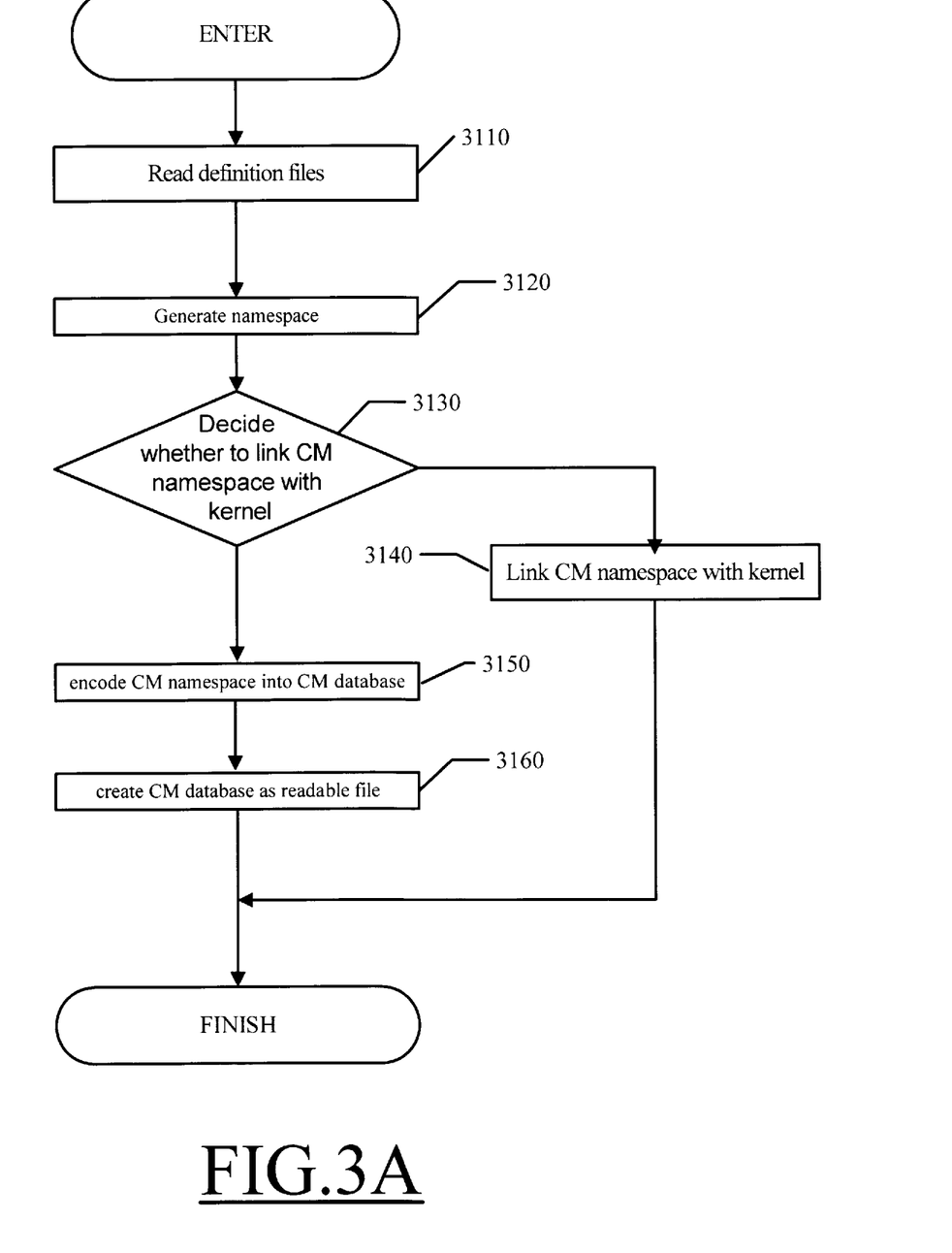
FIG. 3A shows how build files may be used to form a set of buildable statements of hardware policy in an embodiment of the invention.

At build time build files are used to form a set of buildable statements of hardware policy. This can be done in many differing ways; in one exemplary embodiment of the invention this processing is done as shown in FIG. 3A. Referring to FIG. 3A, at Ref. 3110, a build program called SCTPROJ.EXE reads (and in some embodiments may also write) Module definition files and Project definition files which contain macros used to generate CM name space to describe policy.

Figure 3B:
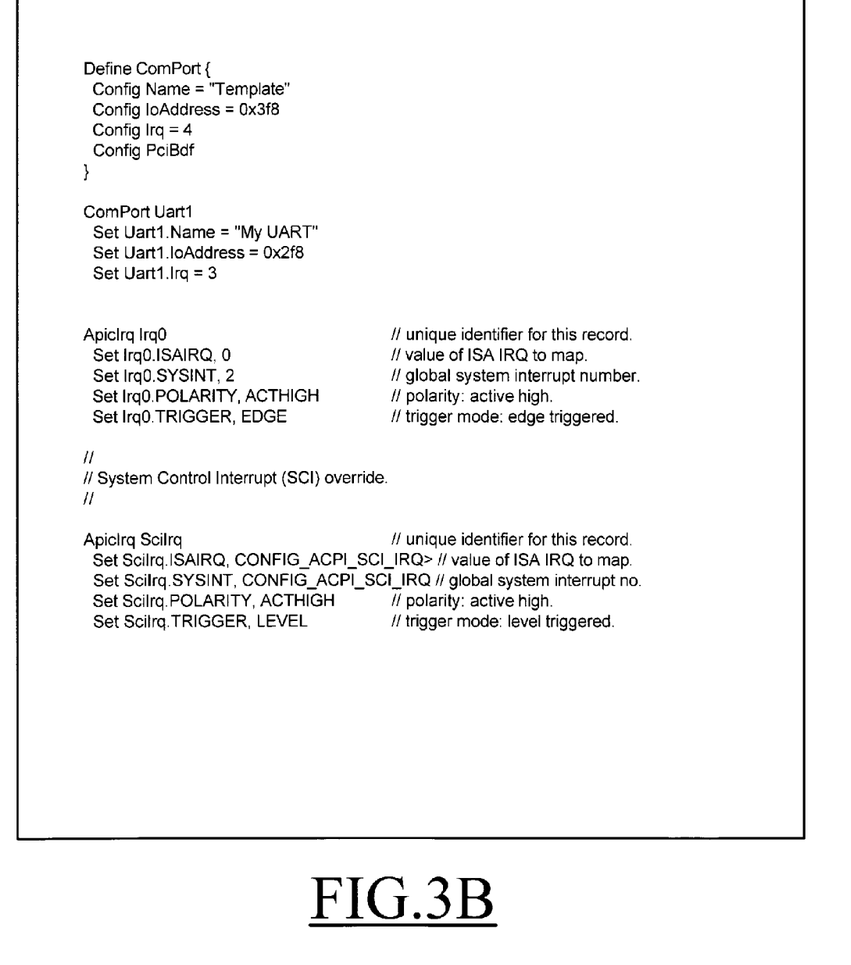
FIG. 3B shows exemplary statements of hardware policy, in an embodiment of the invention.

An exemplary macro (using a "set" statement syntax) is shown in FIG. 3B, it defines policy related to a communications or UART (Universal Asynchronous Receiver/Transmitter) port. Communications ports using UART are well-known in the art. Additional statements in the definition files file may be used to support such things as the description of items such as IRQ routing tables (also shown in part in FIG. 3B), PCI devices, APIC architecture, bootable devices, bootable consoles Referring again to FIG. 3A, At Ref. 3120 the build program decodes the statements and, using the macro definitions as a template, creates a hierarchical name space for the CM and which is recorded in a data file during the build. This file is the CM Database, it is an encoded byte stream representing the CM Namespace.

Still at build time CM Database may be included in the BIOS ROM image along with the system's other components. Choosing at Ref. 3130, in some embodiments of the invention it may be linked in 3140 with object code, for example the Kernel, or it may be encoded 3150 and recorded 3160 for subsequent placement elsewhere from which it may be accessed at run-time such as by a file or a serial programmable memory. Other storage means will be apparent to those of ordinary skill in the art and fall within the general scope of the invention.

In addition to encoding the policy information by creating the CM namespace (and related Database) at build time and making it available through linking or otherwise, embodiments of the invention provide for the system to recall the policies at run time.

Run-time configuration may be managed by the Kernel CM. The CM exposes a programming interface that enables Executive, System, and Application client programs to scan and read the Configuration Manager Namespace, as was defined during the build. The encoded properties (which may be arranged as a tree) are collectively known as the CM Database when such is located in a file on the Firmware Volume, describes the system's hardware organization and its desired run-time behavior. Alternatively the CM Namespace may be linked in at build time.

Although build-time configuration parameters provide for conditional compilation of functionality within core programs and enable tuning of core components and OEM components, SCT2 also supports run-time configuration during PEI and DXE phases.

Logically, the CM Namespace may have a set of top-level names that partition the Namespace by respective owner. These names may include Config, Storage, Setup, Security, APIC, ACPI, and Boot, and this list may expand in the future responsive to addition of new features.

Lower than each top-level name may be a tree structure that describes the system or its behavior in that area. For example, under Boot, the bootable action items can be described. Under Setup, menus and fields may be defined. Under Security, the system's security policies could be described.

Each component's CM statements may be aggregated into a single property tree. A result may be that each component may contribute to many different regions of the tree, offering the information it has about many parts of the system. This is especially important for Super I/O modules, South Bridge modules, and OEM Board modules.

Figure 4:
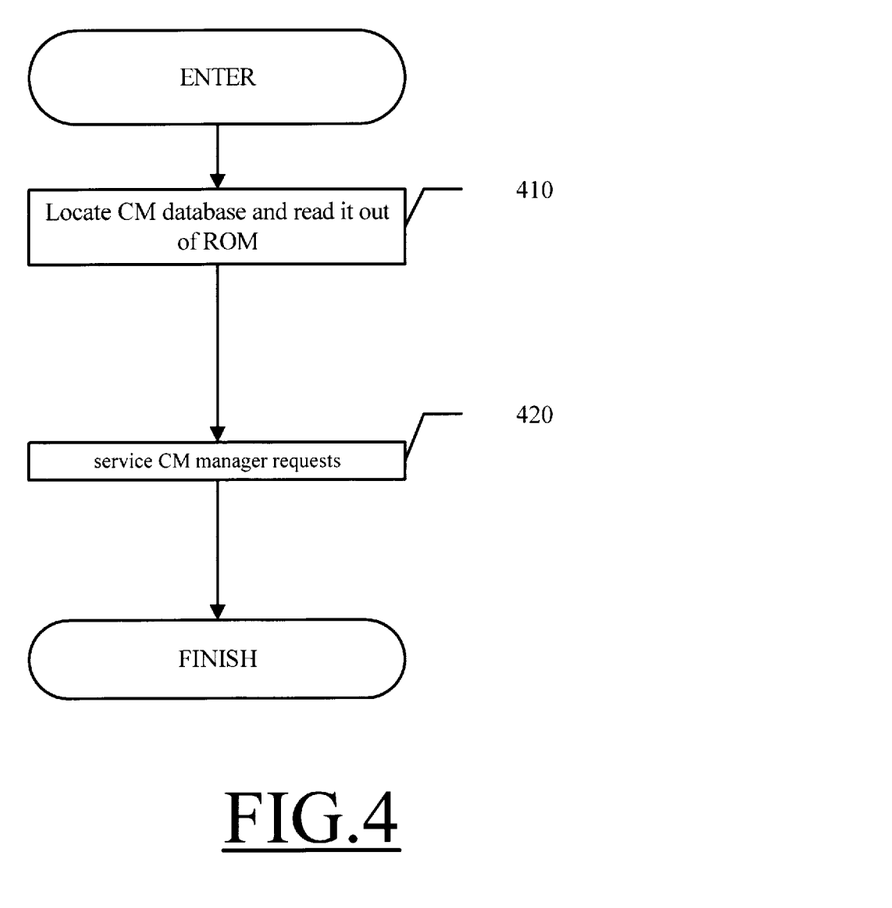
FIG. 4 shows run-time Configuration Manager namespace handling according to an embodiment of the invention.

Referring to FIG. 4, in an embodiment of the invention at 410, at BIOS run-time the Kernel locates the CM Database and reads it from (for example) ROM (read-only memory) into other memory for easy and fast access so as to honor requests for CM services. It should be appreciated that although the other memory could, in some implementations be RAM, it will typically be memory located deeply embedded in the hardware, for example an array within the CPU itself that is later used for on-chip cache but before RAM policies are determined (early PEI phase) and ordinary RAM is system available. Also in some embodiments the CM database may have to be relocated as the hardware environment changes by pulls itself up by its bootstraps through multiple operational modes.

Still referring to FIG. 4, at 420, drivers and applications in the run time environment then make run time queries of the name space to determine the desired behavior of the system as it relates to their operations, and to determine the organization of the hardware.

Figure 5:
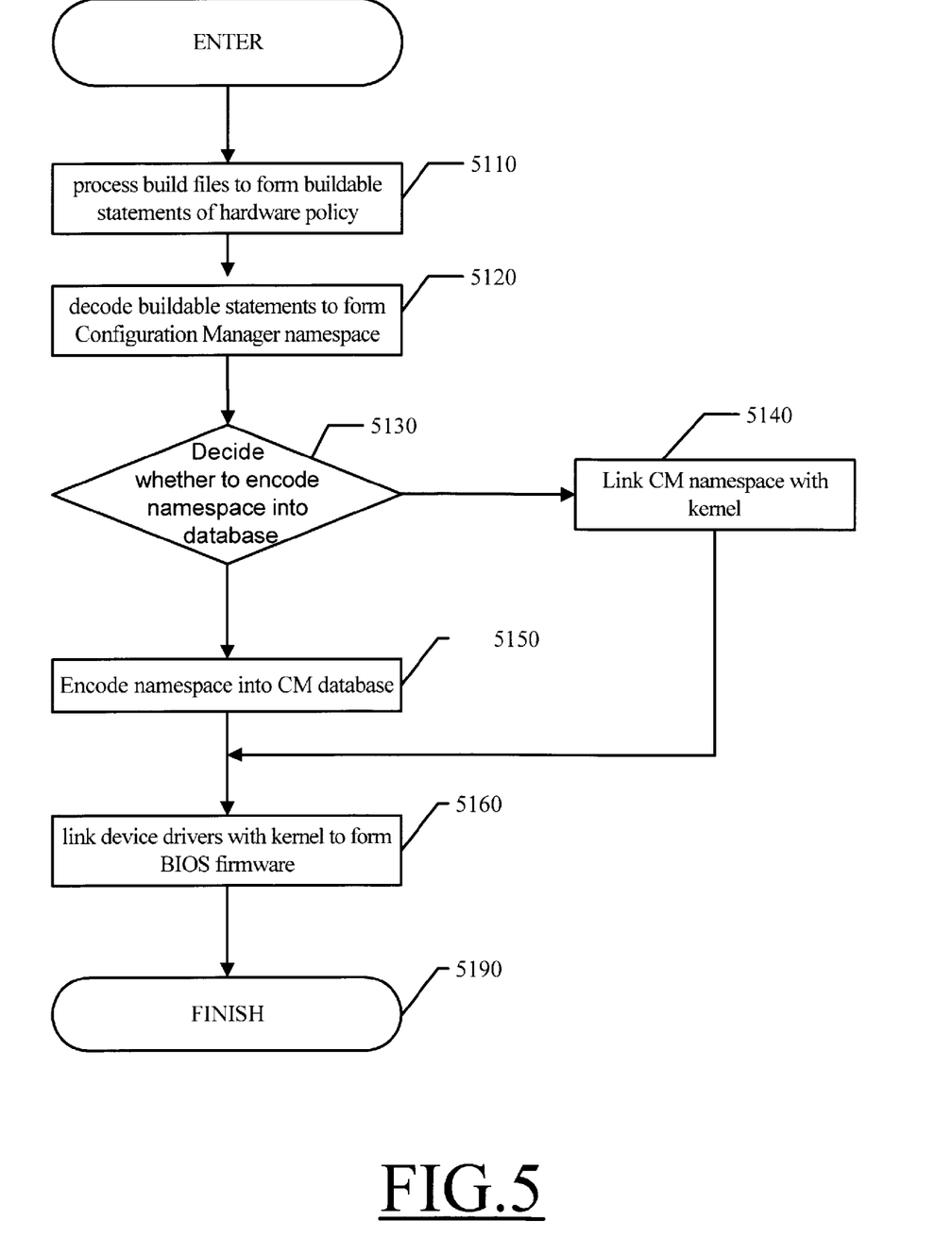
FIG. 5 is a flowchart that shows a method according to an embodiment of the invention that implements the building a firmware component to execute a sequence of instructions to implement policy functions.

FIG. 5 is a flowchart that shows a method according to an embodiment of the invention that implements the building a firmware component to execute a sequence of instructions to implement functions described above. At Ref. 5100 entry is made to a function for building a firmware (or firmware and software) image according to an embodiment of the invention.

At build time at Ref. 5110 a plurality of build files is processed to form a set of buildable statements of hardware policy.

At Ref. 5120, the buildable statements are decoded to form a CM (Configuration Manager) namespace.

At Ref. 5130, decision is made as to whether or not to encode the namespace into a database.

At Ref. 5140, the CM namespace is linked with the UEFI compatible kernel so that the kernel may later (at BIOS run-time) read the namespace.

Alternatively, at Ref 5150, the namespace is encoded into a CM database later readable by the UEFI compatible kernel at run-time.

At Ref. 5160, a plurality of UEFI device driver programs and the UEFI compatible kernel program are linked together to form the BIOS firmware component.

At Ref. 5190 the method ends.

Figure 6:
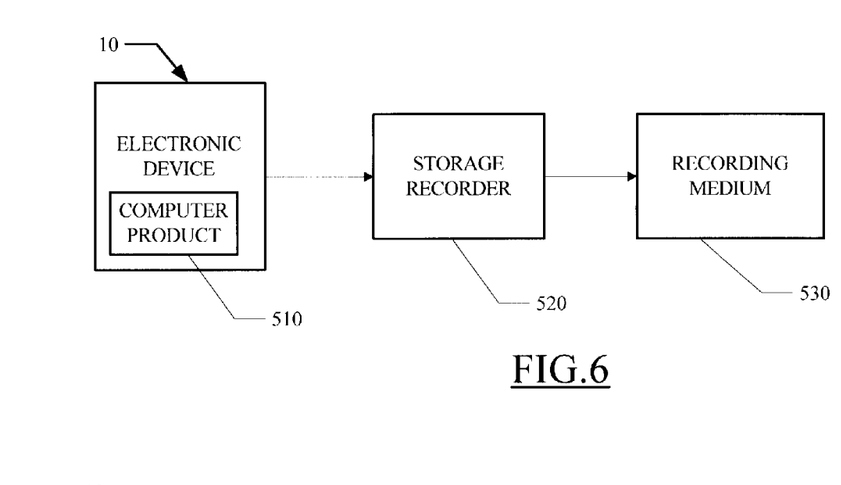
FIG. 6 shows how an exemplary embodiment of the invention may be encoded onto a computer medium or media.

With regards to FIG. 6, computer instructions to be incorporated into an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 6 for clarity but more than one medium may be used and a single computer product may be divided among a plurality of media.

Figure 7:
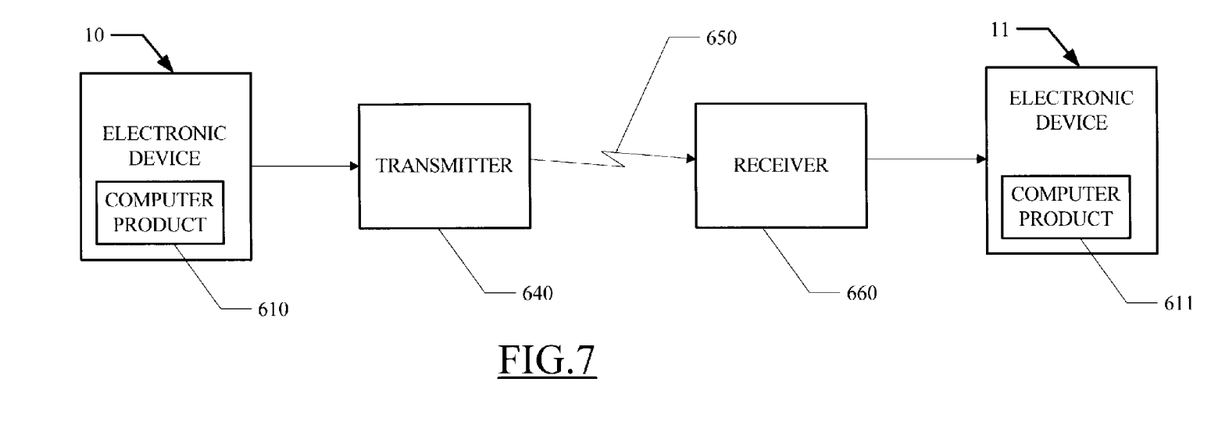
FIG. 7 shows how an exemplary embodiment of the invention may be encoded, transmitted, received and decoded using electro-magnetic waves.

FIG. 7 shows how an exemplary embodiment of the invention may be encoded, transmitted, received and decoded using electro-magnetic waves.

With regard to FIG. 7, additionally, and especially since the rise in Internet usage, computer products 610 may be distributed by encoding them into signals modulated as a wave. The resulting waveforms may then be transmitted by a transmitter 640, propagated as tangible modulated electro-magnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies and/or devices could also be used to construct alternative embodiments of the invention. The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of building a firmware component to execute a sequence of instructions in a device comprising a computer, the method comprising:
   processing a plurality of build files to form a set of buildable statements of hardware policy;
   decoding the buildable statements to form a Configuration Manager namespace;
   performing an action selected from the list consisting of
      a first action of linking contents of the Configuration Manager namespace to a Unified Extensible Firmware Interface (UEFI) compatible kernel program having a Configuration Manager capability, and
      a second action of encoding a data stream representing the contents of the Configuration Manager namespace to form a Configuration Manager database readable by the UEFI compatible kernel program at a run-time; and
   linking a plurality of UEFI device driver programs and the UEFI compatible kernel program to form the firmware component.

2. The method of claim 1, wherein:
the Configuration Manager is configured to operate as a microkernel thread and to provide services to a board module.

3. The method of claim 1, wherein:
the Configuration Manager is configured to operate as a microkernel thread and to provide services to a platform module.

4. The method of claim 1, further comprising:
forming buildable statements of Advanced Configuration and Power Interface (ACPI) policy.

5. The method of claim 1, wherein:
the Configuration Manager provides services using Pre-Extensible Firmware interface module to Pre-Extensible Firmware Interface module interface (PPI).

6. The method of claim 1, wherein:
the Configuration Manager provides services using a driver execution environment (DXE) interface.

7. A non-transitory computer-readable recording medium containing a representation of the firmware component formed by the method according to claim 1.

8. The method of claim 1, wherein:
said performing comprises performing the first action.

9. The method of claim 1, wherein:
said performing comprises performing the second action.

* * * * *